United States Patent [19]

Howeth

[11] Patent Number: 4,637,825

[45] Date of Patent: Jan. 20, 1987

[54] FILTER SYSTEM FOR POWER SWEEPER

[76] Inventor: D. Franklin Howeth, 233 Chuck Wagon Trail, Fort Worth, Tex. 76108

[21] Appl. No.: 680,942

[22] Filed: Dec. 12, 1984

Related U.S. Application Data

[63] Continuation-in-part of Ser. No. 549,963, Nov. 7, 1983, Pat. No. 4,544,389, and a continuation-in-part of Ser. No. 549,924, Nov. 7, 1983, abandoned, and a continuation-in-part of Ser. No. 657,712, Oct. 9, 1984.

[51] Int. Cl.⁴ .............................................. B01D 46/04
[52] U.S. Cl. ....................................... 55/302; 55/497; 55/510; 55/521
[58] Field of Search .................. 55/284, 302, 497–500, 55/510, 521

[56] References Cited

U.S. PATENT DOCUMENTS

| | | | |
|---|---|---|---|
| 2,255,519 | 9/1941 | Preston | 55/302 X |
| 3,097,938 | 7/1963 | Weller | 55/302 |
| 3,173,777 | 3/1965 | Tamny | 55/521 X |
| 3,234,714 | 2/1966 | Rymer et al. | 55/302 X |
| 3,277,633 | 10/1966 | Smoot | 55/302 |
| 3,325,978 | 6/1967 | Rymer et al. | 55/302 X |
| 3,332,217 | 7/1967 | Rymer | 55/497 X |
| 3,417,551 | 12/1968 | Bonell | 55/521 X |
| 3,874,857 | 4/1975 | Hunt et al. | 55/302 |
| 4,007,026 | 2/1977 | Groh | 55/302 |
| 4,209,310 | 6/1980 | Berkhoel | 55/302 X |
| 4,218,227 | 8/1980 | Frey | 55/302 |
| 4,359,330 | 11/1982 | Copley | 55/521 X |
| 4,455,823 | 6/1984 | Bly et al. | 55/499 X |
| 4,465,497 | 8/1984 | Howeth | 55/273 |
| 4,468,240 | 8/1984 | Margraf | 55/302 X |
| 4,514,875 | 5/1985 | Comer | 55/302 X |

Primary Examiner—Robert Spitzer
Attorney, Agent, or Firm—Hubbard, Thurman, Turner & Tucker

[57] ABSTRACT

A porous media air filter unit for a power sweeper includes an impingement or barrier type filter element mounted on a combination support plate and clean air discharge plenum which redirects the filtered air flow at right angles relative to the central axis of the filter element. Multiple reverse jet backflushing air discharge manifolds are mounted generally alongside the filter element and at the outlet of the clean air discharge plenum for directing plural jets of reverse flow filter cleaning air into the plenum for periodically cleaning the filter element. Reverse jet cleaning air is supplied to a supply manifold by a compressor onboard the power sweeper. The supply manifold forms a wall of a housing forming a clean air chamber and supports an array of reverse jet air discharge manifolds and pilot operated control valves. The clean air plenum may be provided with interior partitions to separate the plenum into a plurality of separate flow passages for conducting clean filtered air in one direction and reverse jet cleaning air in the other direction to maximize cleaning air energy for dislodging particulate material from the filter element. The filter element includes removable divider plates for dividing the element clean air chamber into plural chamber segments.

10 Claims, 14 Drawing Figures

FILTER SYSTEM FOR POWER SWEEPER

CROSS REFERENCE TO RELATED APPLICATION

This application is a continuation-in-part of U.S. patent applications Ser. No. 549,963, filed Nov. 7, 1983, U.S. Pat. No. 4,544,389; Ser. No. 549,924, filed Nov. 7, 1983, now abandoned and Ser. No. 657,712 filed Oct. 9, 1984.

BACKGROUND OF THE INVENTION

1. Field of the Invention

The present invention pertains to a porous media barrier or impingement type air filter unit including an improved filter element construction and a multiple jet reverse air flow backflushing type filter cleaning system particularly adapted for a power sweeper and other low profile, compact installation.

2. Background

In the art of power sweepers and similar types of equipment various attempts have been made to develop air filters for removing the particulate matter entrained in the sweeper vacuum air flow system. Conventional power sweepers are typically provided with a hopper which may include a vacuum or suction air flow system including a filter which is periodically cleaned by vibrating the filter element or simply by requiring that the filter element be removed and replaced. There are several disadvantages associated with prior art type power sweeper filters and an important aspect of the filter system requires that the filter be very compact, be capable of sustaining high loadings of particulate material entrained in the sweeper suction air stream and be capable of automatic or selective cleaning operations without removing the filter from the hopper.

My above referenced U.S. patent applications pertain to an improvement in porous media barrier type air filters wherein a substantial amount of reverse direction flow of cleaning air is provided using a multple jet nozzle arrangement for thoroughly cleaning filters which are subject to particularly high air flow rates. The present invention pertains to further improvements in air filter units and filter elements including a multiple jet reverse air flow filter cleaning or backflushing system and which is particularly attractive for applications such as industrial power floor or street sweepers and the like.

SUMMARY OF THE INVENTION

The present invention provides an improved filter system particularly adapted for use in conjunction with power sweepers and other applications requiring a compact heavily loaded filtering unit and wherein a porous media barrier or impingement type air filter is cleaned by a multiple jet reverse air flow backflushing system.

In accordance with one aspect of the present invention, there is provided an air filter unit for a power sweeper wherein an elongated somewhat oval shaped barrier type filter element is cleaned by reverse flow air jet means including a plurality of reverse flow cleaning air jet manifolds each having plural jet orifices whereby a substantial flow of cleaning air is conducted in the reverse direction through the filter element and is utilized to dislodge particulate material accumulated on the filter element itself.

The backflushing air jet manifolds are arranged at the outlet of a segmented, filtered air discharge plenum or flow tube which turns the filtered air flow through a substantially right angle bend or turn as it leaves the filter element. The reverse jet cleaning air manifolds may be arranged in vertically stacked relationship at the respective outlets of the plenum segments or ducts and are each controlled by separate control valves receiving pressure air from a common air storage manifold. The reverse jet cleaning air manifolds and the air supply manifold are uniquely arranged within an enclosure or housing at one end of the filtered air discharge plenum.

In accordance with yet another aspect of the present invention there is provided a self cleaning filter unit wherein reverse jet air flow nozzles are arranged to direct the jet flow stream initially in a direction substantially perpendicular to the central axis of the filter element being cleaned. The reduced dimensional envelope of the filter element, discharge flow tube or plenum, and reverse air jet backflushing apparatus is particularly advantageous for applications requiring a compact filter unit and the filter unit may be mounted in a variety of positions of the filter elements themselves.

In accordance with still another aspect of the present invention, there is provided a unique porous media type filter element which is adapted to support one or more divider plates for dividing a clean air flow chamber into the plurality of subchambers to enhance the filter cleaning action of the multiple jet reverse air flow cleaning system. The improved porous media filter elements preferably are characterized by a pleated paper or fiber type filter media member which is supported between opposed end caps which are formed to include retaining means for removably retaining one or more generally planar divider plates for dividing a clean air flow chamber defined by the filter element into a plurality of subchambers.

Those skilled in the art will further appreciate the above described features and advantages of the present invention as well as other superior aspects thereof upon reading the detailed description which follows in conjunction with the drawing.

DESCRIPTION OF THE PREFERRED EMBODIMENTS

Figure 1:
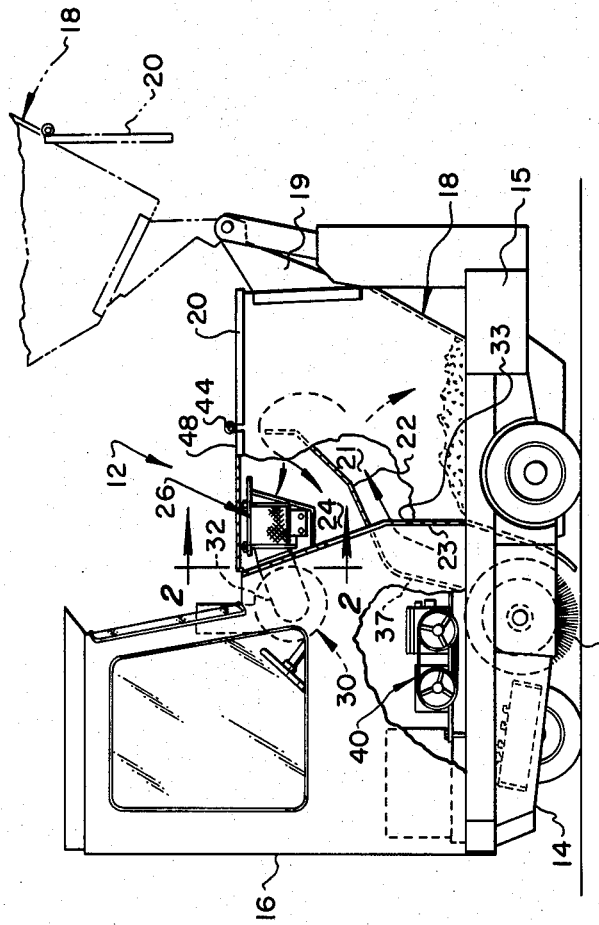
FIG. 1 is a side elevation of a self propelled power sweeper including one preferred embodiment of an air filter unit in accordance with the present invention.

In the description which follows like parts are marked throughout the specification and drawing with the same reference numerals, respectively. The drawing figures are not necessarily to scale and certain features of the invention may be shown exaggerated in scale or in somewhat schematic form in the interest of clarity and conciseness.

Referring to FIG. 1, one preferred embodiment of a filter unit in accordance with the present invention is particularly adapted for use with a power sweeper, generally designated by the numeral 12. The power sweeper 12 includes a self propelled undercarriage 14 having an operator's cab 16 and a dust and debris collection hopper, generally designated by the numeral 18. The hopper 18 is a generally rectangular boxlike container having opposed sidewalls 17, FIG. 2, and which is preferably mounted on the frame 15 of the power sweeper 12 by support brackets 19, one shown, for pivotal movement between the working position illustrated by the solid lines in FIG. 1 and an elevated position wherein a discharge door 20 may open to discharge debris collected within the interior chamber or space 21 of the hopper 18.

The hopper 18 typically includes an interior partition 22 extending from a rear wall 23 to provide a secondary interior chamber 24 in which a porous media impingement or barrier type filter unit 26 is disposed. As will be described further herein, the power sweeper 12 includes a motor driven suction air pump or fan 30 which is in air flow receiving communication with the filter unit 26 by way of an inlet conduit 32 for drawing air entrained with particular matter into the hopper 18 through an inle opening 33. Relatively heavy particles of debris and dirt are allowed to settle into the bottom of the hopper interior space 21 and the induced air flow into the chamber 24 passes through the filter unit 26 before being discharged back into the atmosphere through the fan 30. The power sweeper 12 also includes a rotary sweeping brush 35 arranged to propel material through a chute 37 into the hopper interior space 21 through the opening 33. As illustrated in FIG. 1, the power sweeper 12 also includes a motor driven air compressor unit, generally designated by the numeral 40, mounted onboard the sweeper for a purpose to be described further herein.

The filter unit 26 is particularly adapted to be disposed within the secondary air flow chamber 24 and in this regard must occupy a minimum space, be capable of filtering air with relatively high loadings or densities of entrained particular matter and is desirably self cleaning so that there is no need to periodically replace or manually clean the filter unit itself.

Figure 2:
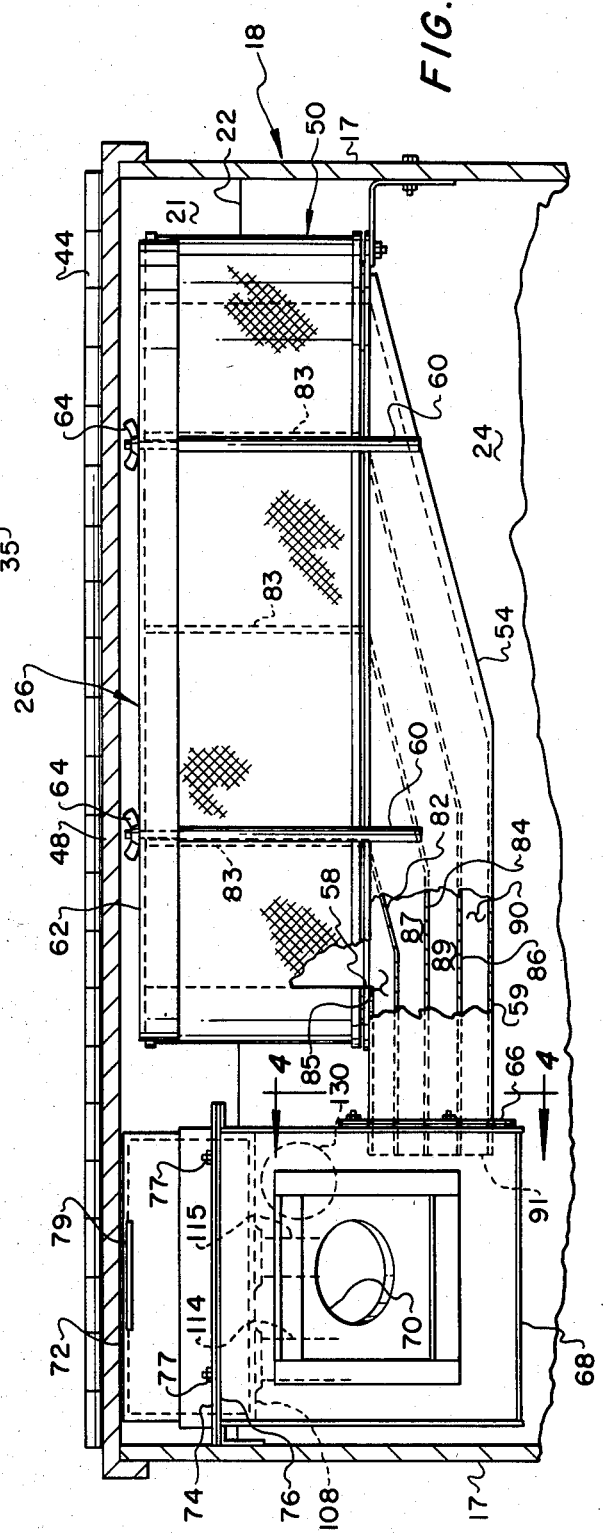
FIG. 2 is a section view taken generally along the line 2—2 of FIG. 1.
Figure 3:
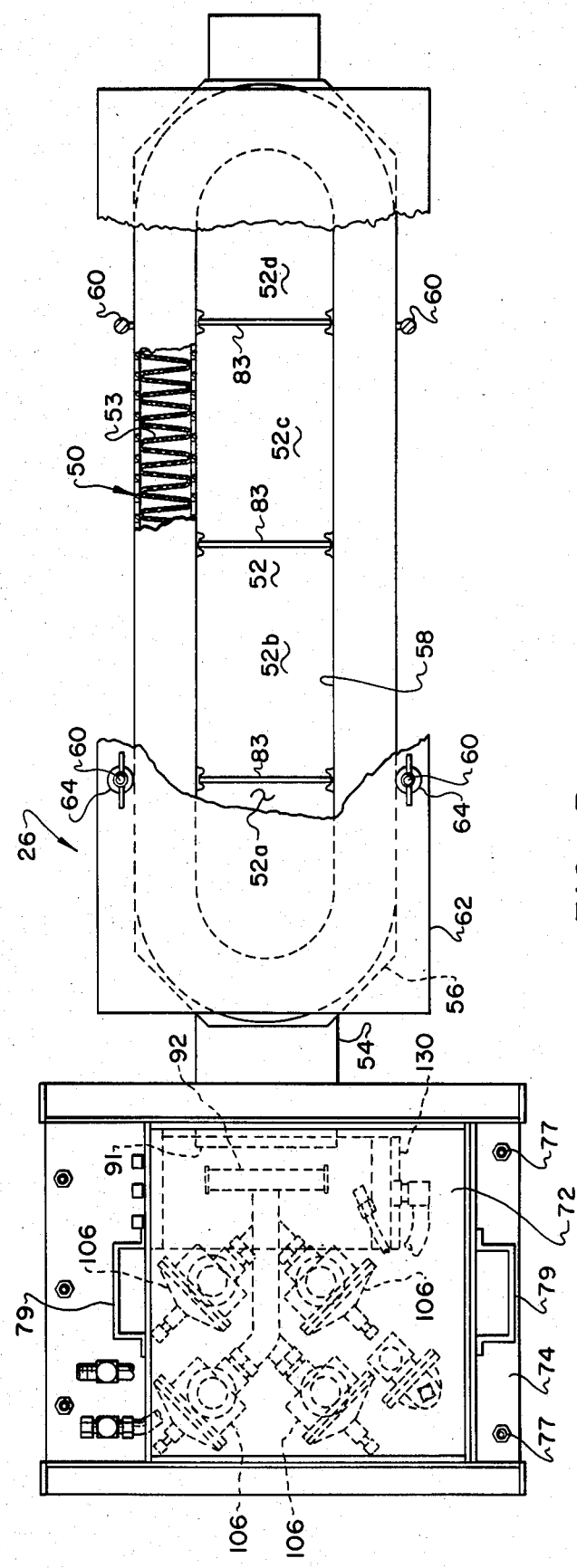
FIG. 3 is a plan view of the filter unit.

Referring now to FIGS. 1 and 3, the filter unit 26 is illustrated in FIG. 2 suitably mounted within the interior chamber 24 of the hopper 18 between the opposed side walls 17 and covered by a hinged door 48 forming a top wall of the hopper in conjunction with the material discharge door 20. The doors 20 and 48 may be hinged at 44 by suitable means extending between the sidewalls 17. The filter unit 26 includes a porous media barrier or impingement type filter element, generally designated by the numeral 50, which is of a generally elongated oval shape, has a central axis of symmetry 51 and defines, in part, an interior clean air flow chamber 52, FIG. 3. The filter element 50 is preferably of the pleated, porous paper type similar in some respects to the types described in the above referenced patent applications but also of unique construction to be described in further detail herein. The filter element 50 functions to filter air flowing from the exterior of the element through a pleated paper media 53, FIG. 3, into the chamber 52, whereby particulate material impinges on and collects on the media 53 and periodically must be removed to maintain filter operation and prevent substantial air flow reductions or rupture of the filter element.

The filter element 50 is mounted on a segmented, multiple duct discharge air plenum or flow tube, generally designated by the numeral 54. The plenum 54 includes a filter element support plate 56 having an elongated opening 58, Figure 3, formed therein and having the same general configuration as the peripheral outline of the clean air chamber 52. The plate 56 supports a plurality of upstanding retaining rods 60 arranged along both sides of the opening 58 and adapted to secure the element 50 to the plate by a top closure plate 62 and a plurality of wing nuts 64 threadedly coupled to the rods 60.

The filtered air discharge plenum 54 includes a mounting flange 66 extending in a plane generally perpendicular to the plane of the element support plate 56. The plenum 54 is adapted to be secured to a housing 69 including a reverse jet cleaning air system to be described further herein. The housing 68 includes a clean air flow discharge opening 70 which, in the closed position of the hopper 18, illustrated in FIG. 1, is aligned with the fan inlet conduit 32 whereby air may be drawn through the hopper chambers 21 and 24, the filter element 50, the clean air chamber 52, the plenum 54 and an interior chamber 71 of the housing 68 for discharge to atmosphere. The housing 68 is adapted to support a generally rectangular pressure air supply manifold 72 on the top side thereof. The manifold 72 and the housing 68 are secured to each other in sealed relationshp by cooperating mating peripheral flanges 74 and 76 and suitable threaded fasteners 77. The pressure air supply manifold 72 is of a generally rectangular closed box configuration and is dimensioned to partially nest within the open topside of the housing 68. The manifold 72 preferably includes opposed lifting handles 79 whereby the manifold and structure secured thereto may be removed from the housing 68 upon disconnection of the fasteners 77 with respect to the flange 74.

Figure 4:
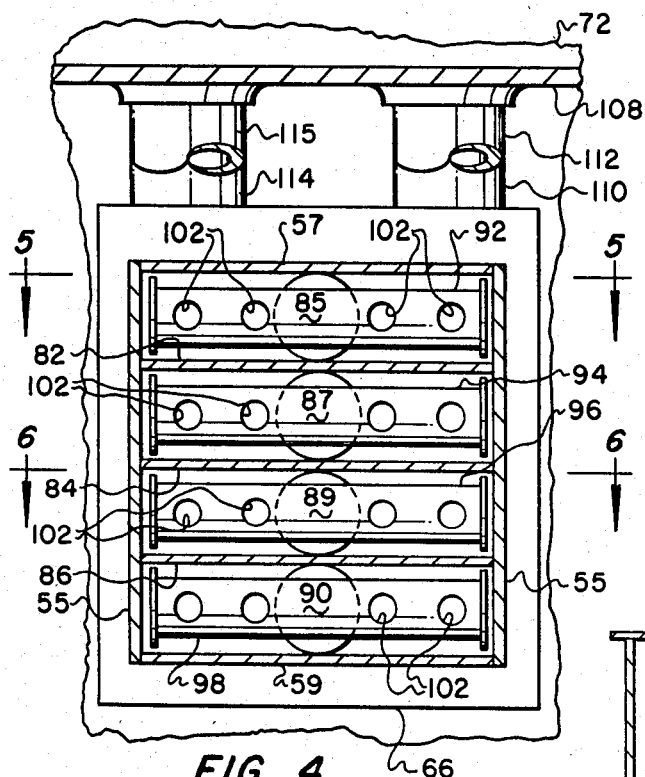
FIG. 4 is a section view taken along the line 4—4 of FIG. 2.

Referring briefly to FIGS. 2 and 4, the plenum 54 is of generally rectangular configuration including opposed sidewalls 55 and top and bottom walls 57 and 59, respectively. Longitudinal partitions 82, 84, and 86 extend between the opposed sidewalls 55 and, as shown in FIG. 2, slope upwardly and terminate at spaced apart points along the opening 58 to form separate clean air and reverse jet air flow ducts or passages 85, 87, 89 and 90, respectively, as shown in FIGS. 2 and 4. Vertically oriented partition plates 83 are disposed spaced apart in the chamber 52 and are aligned with the partitions 82, 84 and 86 at their repective ends which terminate at the opening 58. Accordingly the interior clean air chamber 52 is actually divided into four subchambers 52a, 52b, 52c, and 52d whereby clean air flowing through the filter unit 26 exits the chamber 52 through the respective passages 85, 87, 89 and 90 and into the interior chamber 71 of the housing 68. The cross sectional flow areas of the passages 85, 87, 89 and 90 are substantially equal with respect to each other, at least at the outlet end 91 of the plenum 54 where the passages empty into the chamber 71.

Figure 5:
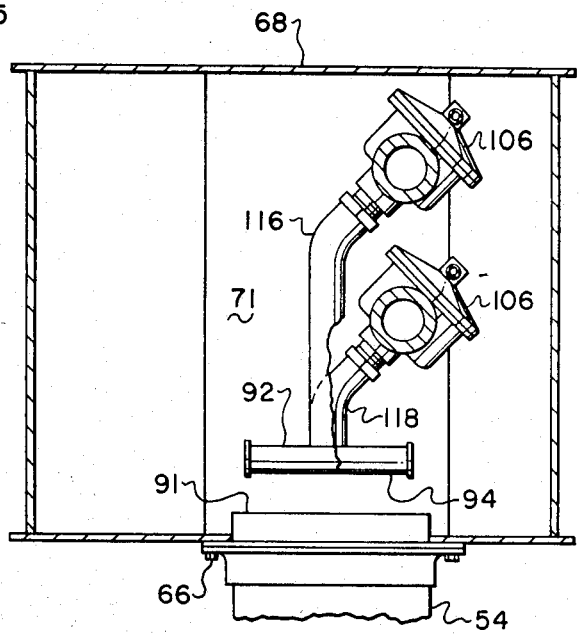
FIG. 5 is a section view taken along the line 5—5 of FIG. 4.
Figure 6:
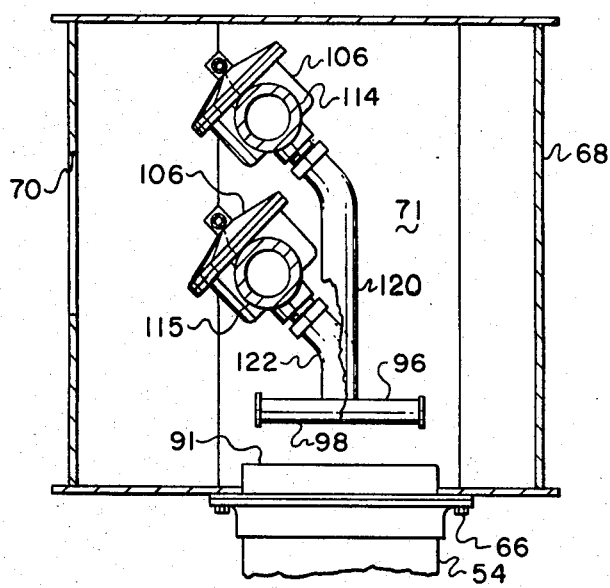
FIG. 6 is a section view taken along the line 6—6 of FIG. 4.

As illustrated in FIGS. 4, 5 and 6 the filter unit 26 includes a plurality of reverse jet pressure air discharge manifolds 92, 94, 96 and 98 substantially aligned with the passages 85, 87, 89 and 90, respectively, and disposed within the chamber 71 and spaced from the outlet end 91 of the plenum 54. Each of the manifolds 92, 94, 96 and 98 includes a plurality of spaced apart directionally aligned orifices 102 formed therein and adapted to direct freely expanding jets of pressure air generally horizontally into the passages 85, 87, 89 and 90 to provide a substantial volume of jetted air and induced ambient air to flow through the passages in a direction from the end 91 toward the chamber 52 to backflush the filter element 50 by thoroughly flooding the media 53 with air flowing in the reverse direction with respect to the normal flow of air when the filter unit is operating to clean the air drawn through the hopper 18. The placement of the manifolds 92, 94, 96 and 98 relative to the plenum outlet 91 is in accordance with the teaching of the above referenced patent applications. Each of the manifolds 92, 94, 96 and 98 is supported by a conduit connected to a high volume pilot pressure air operated shut-off valve 106. Each of the valves 106 is supported by and below the bottom wall 108 of the supply air manifold 72 on respective rigid air conducting conduits or pipe sections 110, 112, 114 and 115, respectively. As shown in Figure 5, for example, the manifold 92 is supported at the end of a support conduit 116 and in communication with a valve 106 supported by the conduit 110. The manifold 94 is in communication with its valve 106 by way of a conduit 118 and in communication with the supply manifold 72 by a support conduit 112.

Referring to FIG. 6, in like manner the manifold 96 is supported by a supply air conduit 120 connected to a valve 106 which in turn is supported by the conduit 114. Finally, the manifold 98 is supported by a supply air conduit 122 which is connected to a valve 106 supported by a conduit 115 connected to the bottom wall of the manifold 72. The valves 106 may be sequentially operated to open to discharge pressure air from the manifold 72 into the respective multiple jet discharge manifolds 92, 94, 96 and 98 by operation of the valves utilizing a control circuit similar to that described in my U.S. Pat. No. 4,465,497.

Thanks to the arrangement of the respective manifold support conduits 116, 118, 120 and 122 the valves 106 may be arranged in staggered relationship within the interior chamber 71 of the housing 68 so that the manifolds 92, 94, 96 and 98 may also be disposed vertically aligned and closely adjacent to each other. Moreover, the configuration of the plenum 54 wherein the air flowing from the filter unit 50 and the air being jetted into the chamber 52 in reverse direction is turned through approximately a 90° flow path provides for a very compact arrangement of the filter unit 26. It is preferable that the control circuit for operating the valves 106 be disposed within a housing 130 supported on the bottom side of the manifold 72 and operably connected to each of the valves 106 whereby the entire assembly of the reverse jet discharge manifolds and operating controls therefor may be removed from the housing 68 in assembly with the manifold 72.

Figure 10:
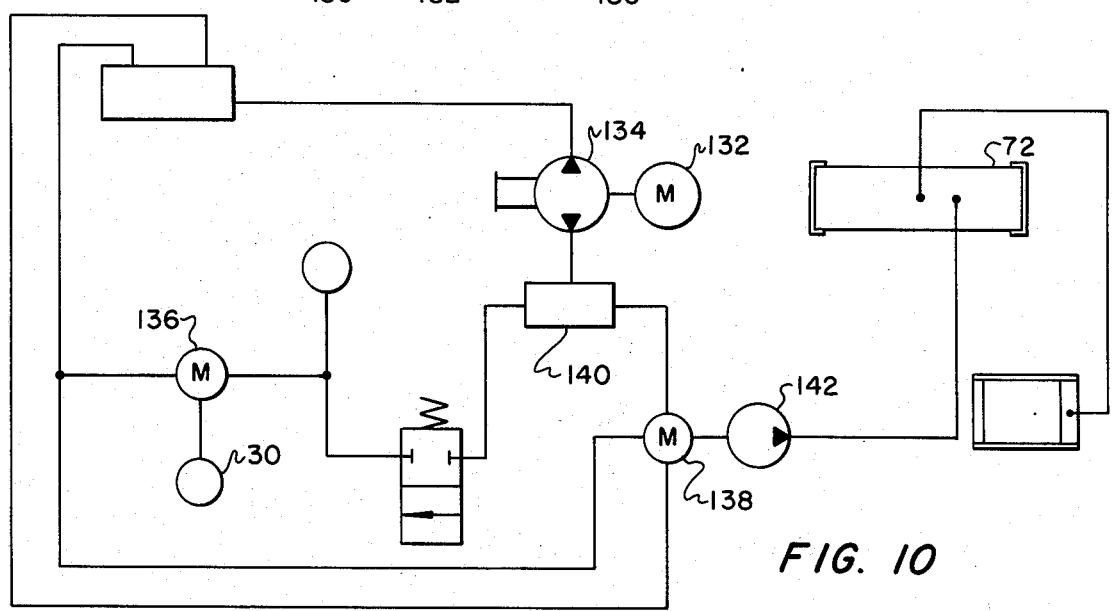
FIG. 10 is a schematic diagram of a control system for the filter unit illustrated in FIGS. 1 through 6.

Referring briefly to the diagram of FIG. 10, the power sweeper 12 includes a main propulsion motor 132 drivably connected to a hydraulic pump 134 which is operable to supply pressure fluid to respective hydraulic motors 136 and 138 through a flow divider valve 140. The motor 136 is drivably connected to the suction fan 32 and the motor 138 is drivably connected to an air compressor 142 forming part of the compressor unit 40. The compressor 142 is operable to supply pressure air to the manifold 72 which supplies pressure air to the control circuit housing 130 and, of course, to each of the reverse jet air discharge manifolds 92, 94, 96 and 98.

The operation of the power sweeper 12 and the filter unit 26 is believed to be readily understandable from the foregoing description. Suffice it to say that air flowing through the chamber 21 into the chamber 24 is cleaned substantially by flow through the filter element 50 into the chamber 52 and through the plenum 54, the interior chamber 71 and the fan conduit 32 for eventual discharge to atmosphere. The filter element 50 is preferably backflushed with substantial volumes of cleaning air flowing in the reverse direction through the plenum 54 by periodically opening the valves 106 in timed sequence as determined by the aforementioned control circuit for discharging substantial volumes of pressure air from the manifold 72 through the respective discharge manifolds 92, 94, 96 and 98. A plurality of freely expanding overlapping jets of pressure air are discharged from each discharge manifold and expand into contact with the walls defining the respective passages 85, 87, 89 and 90 to form a dynamic pressure seal whereby air is forced to flow in substantially the reverse direction to clean respective segments of the filter element 50.

Figure 7:
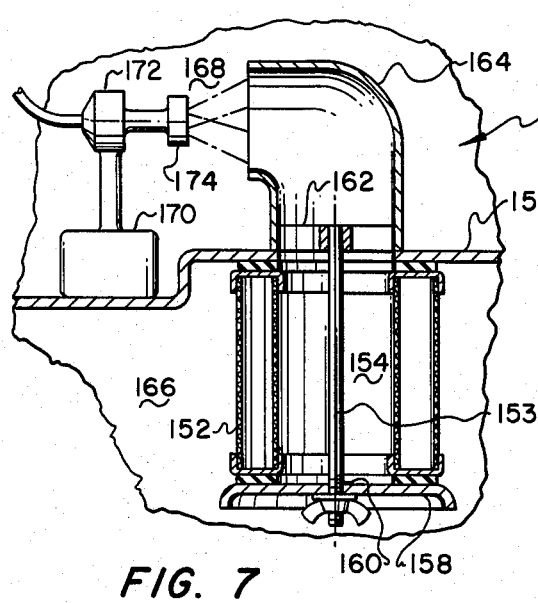
FIG. 7 is a side view of a first alternate embodiment of a filter unit in accordance with the present invention.

Referring now to FIG. 7 one alternate embodiment of a filter unit in accordance with the present invention is illustrated and generally designated by the numeral 150. The filter unit 150 includes a generally cylindrical, pleated paper, porous media type filter element 152 having a longitudinal central axis 153 and defining an interior clean air flow chamber 154. The filter element 152 is supported on a partition or aperture plate 156 by a lower cover member or end plate 158 and a support rod 160 extending upward and connected to a flow divider web 162. The web 162 is secured within a cylindrical substantially 90° elbow type air discharge plenum or flow tube 164. The flow tube 164 extends upward from the aperture plate 156 which separates a contaminated air chamber 166 from a clean air discharge chamber 168. The filter unit 150 also includes a supply air manifold 170 which is operably connected to a quick opening high volume valve 172 for discharging pressure air through a multiple jet discharge manifold 174 whereby a substantially enveloping freely expanding flowstream of pressure air is discharged into the flow tube 164 and entrains ambient pressure air to flood the filter element 152 to backflush or suitably remove particulate material accumulated on the surface of the element. Again, thanks to the arrangement of the 90° right angle flow tube 164, a more compact arrangement may be obtained for the filter element 152, the backflushing supply air manifold 170, valve 172 and discharge manifold 174. With the arrangement of the filter unit 150, the filter element 152 may be maintained in a generally vertically oriented position so that particulate material dislodged from the surface of the element into the chamber 166 will typically fall clear of the element into a material collecting hopper or the like, not shown.

Figure 9:
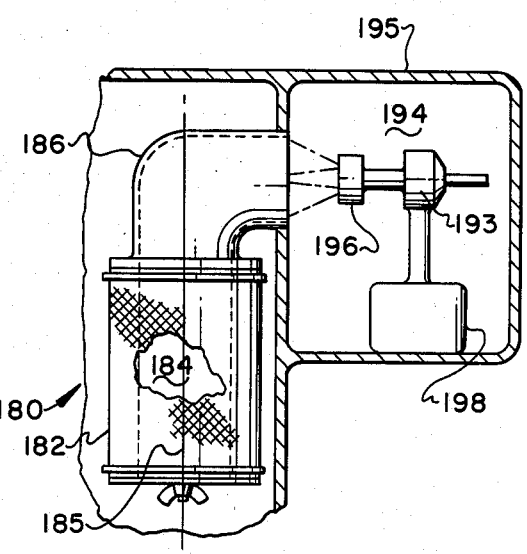
FIG. 9 is a side elevation view of the filter unit illustrated in FIG. 8.
Figure 8:
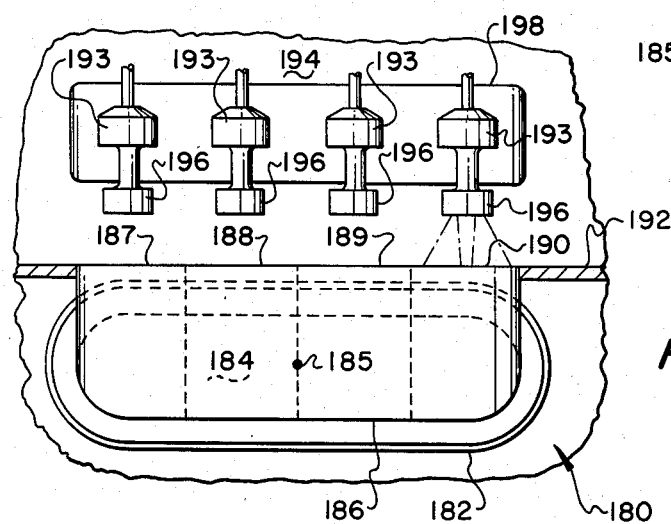
FIG. 8 is a plan view of a second alternate embodiment of a filter unit in accordance with the present invention.

Referring to FIGS. 8 and 9, another embodiment of a filter unit and backflushing air assembly which provides for turning the filtered air and backflushing air flow through an angle of approximately 90° is illustrated and generally designated by the numeral 180. The filter unit 180 includes an elongated, generally oval shaped filter element 182 defining, in part, an interior clean air flow chamber 184 and having a central axis 185. The filter element 182 is similar to the element 50 and is suitably supported on a segmented flow tube or plenum 186 having respective duct segments 187, 188, 189 and 190 which are each in communication with the clean air flow chamber 184 and open through a partition 192 into a clean air discharge chamber 194.

A plurality of reverse jet air discharge manifolds 196 are mounted horizontally spaced apart on a supply air manifold 198 and positioned for discharging overlapping freely expanding jets of pressure air to flood the respective ducts 187, 188, 189 and 190 to backflush the filter element 182. The chamber 194 is formed in a clean air discharge housing 195 and the orientation of the filter element 182 is such that it extends generally vertically. The manifolds 196 are mounted on respective valves 193 above the manifold 198 and discharge the jets of backflushing air horizontally downwardly wherein the backflow of flushing air is turned through an angle of at least about 90°. Accordingly, the arrangement illustrated in FIGS. 8 and 9 also provides for a compact filter unit by positioning of the reverse jet backflushing air structure generally alongside the filter element 182.

Figure 11:
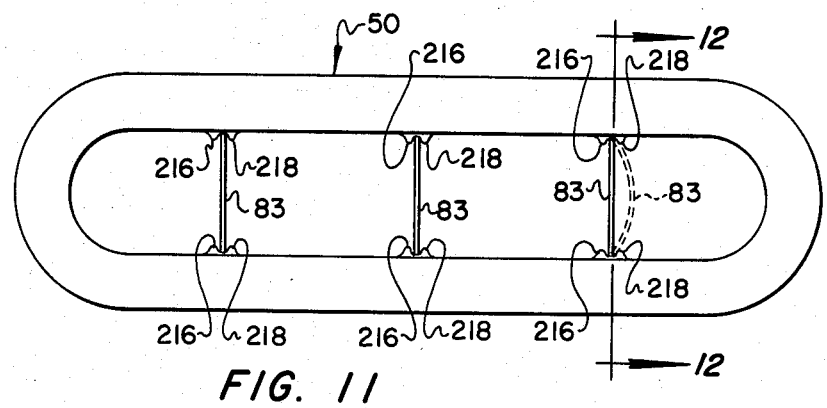
FIG. 11 is a plan view of an improved porous media barrier type filter element in accordance with the present invention.
Figure 12:
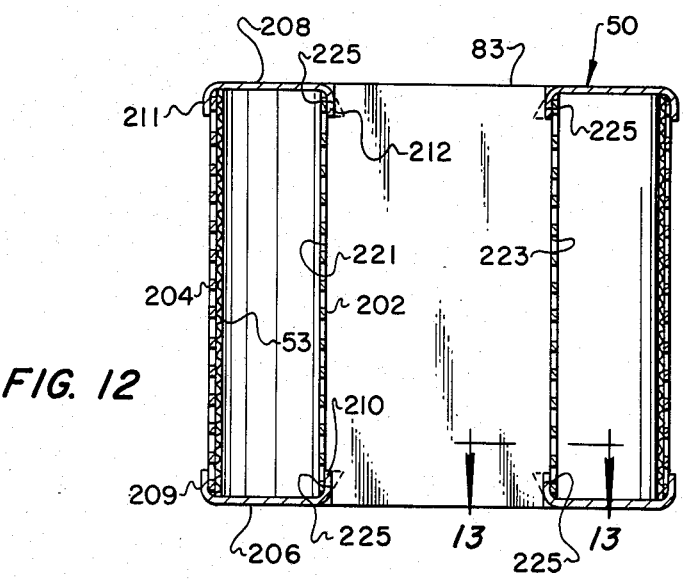
FIG. 12 is a section view taken along the line 12—12 of FIG. 11.

Referring now to FIGS. 11 through 14, the filter element 50 is illustrated in further detail and showing the unique construction for supporting a plurality of the relatively thin, flexible divider plates 83. Referring to FIGS. 11 and 12, in particular, the essentially continuous pleated paper media member 53 is supported between inner and outer annular perforated metal support walls 202 and 204 which extend around the entire inner and outer periphery of the filter element. The construction of the filter element 50 also includes opposed continuous annular end caps 206 and 208 which are of virtually identical construction and are characterized, preferably, by stamped sheet metal members. For example, the end cap 206 is formed as a generally continuous shallow channel having upturned flanges 209 and 210 between which are disposed the support plates 202 and 204 and the media member 53. The end cap 208 is of virtually identical construction having down turned peripheral flanges 211 and 212. The end caps 206 and 208 may be secured in assembly with the support plates 202 and 204 by tack welding or securing the end caps to the plates with a suitable adhesive.

Figure 13:
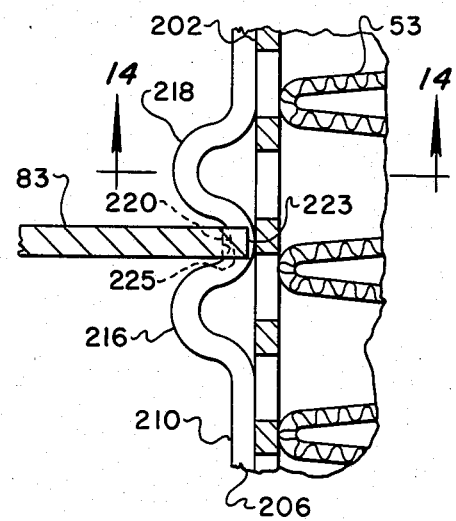
FIG. 13 is a detail section view taken along the line 13—13 of FIG. 12.
Figure 14:
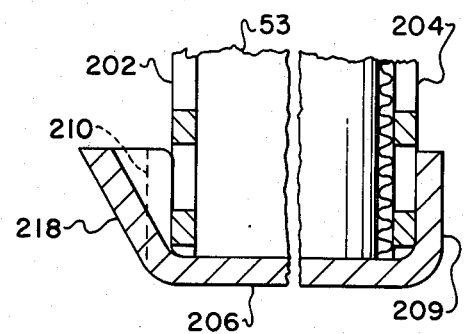
FIG. 14 is a detail section view taken along the line 14—14 of FIG. 13.

Referring to FIGS. 13 and 14, by way of example, the flanges 210 and 212 are suitably displaced at spaced apart intervals to form pairs of projections 216 and 218 defining therebetween a recess 220 for receiving and retaining the divider plates 83 within the space defining the clean air flow chamber 52 and thereby dividing the flow chamber into the respective subchambers 52a, 52b, 52c and 52d. The projections 216 and 218 may be formed by suitable metal forming operations during the formation of the respective end caps 206 and 208 by displacing the flange portions 210 and 212 as illustrated in FIGS. 13 and 14. Each set of projections 216 and 218 is aligned with a corresponding set of projections directly across the chamber 52 on the same end cap member and also aligned with a corresponding set of projections on the other end cap.

Referring to FIG. 12, the partition or divider plates 83 are preferably formed with opposed longitudinal sides 221 and 223 which are notched at their opposite ends to form generally rectangular recesses 225 at each corner of the generally rectangular plates, respectively. The plates 83 are preferably formed of relatively thin metal or plastic which may be flexed into the position illustrated by dashed lines in FIG. 11 so that the plates may be inserted in the recesses 220 between the spaced projections 216 and 218 and retained therein with the opposed longitudinal sides 221 and 223 virtually contiguous with the continuous inner support plate 202, as illustrated in Figure 12. Those skilled in the art will recognize that the divider plates may be configured in other ways and supported within the chamber 52 to divide the chamber into a plurality of subchambers. However, with the arrangement of the filter element 50 illustrated, the element itself may be replaced without requiring replacement of the divider plates by merely flexing the respective plates to remove them from the filter element if the element requires replacement.

Those skilled in the art will recognize from the foregoing description that particularly compact self cleaning air filter units have been provided utilizing the improved reverse jet cleaning or backflushing air flow system of the present invention together with the unique filter elements and the arrangement of the air discharge manifolds and the air plenum or flow tube configurations which provide for mounting the filter elements in a desired attitude in relation to the associated filter structure. Although preferred embodiments of the invention have been described herein in detail, those skilled in the art will recognize that various substitutions and modifications may be made to the specific embodiments described without departing from the scope and spirit of the invention as recited in the appended claims.

What I claim is:

1. An air filter unit for apparatus such as a power sweeper, including a debris collection and separation hopper, said filter unit being adapted to be supported in said hopper and including:
   a porous media barrier type filter element forming an enclosure defining a clean air chamber and including at least one divider plate means extending across said clean air chamber into a plurality of subchambers with means for supporting said divider plate means in said clean air flow chamber;
   support means for said filter element;
   means forming an opening through which filtered air flows to said clean air chamber;
   a clean air discharge plenum for conducting clean air from said clean air flow chamber to an outlet of said plenum, said plenum being configurered for redirect air flow at substantially a right angle relative to air flow exiting said clean air chamber; and
   reverse jet air discharge means disposed adjacent to the outlet of said plenum for discharging jets of pressure air through said plenum to backflush said filter element.

2. The filter unit set forth in claim 1 wherein:
   said plenum includes means forming a plurality of separate passages in communication with said clean air chamber and said outlet for conducting filtered air from respective portions of said filter element to said outlet; and said reverse jet air discharge means includes means for discharging jets of pressure air into each of said passages for backflushing said portions of said filter element, respectively.

3. The filter unit set forth in claim 2 wherein:

said reverse jet air discharge means includes a plurality of separate pressure air discharge manifolds, each of said discharge manifolds including plural air discharge orifices directed toward said passages, respectively, for discharging plural jets of pressure air into said passages.

4. The filter unit set forth in claim 3 wherein:

said discharge manifolds are supported on a supply air manifold for said filter unit, said supply air manifold being removably supported in a housing disposed at the outlet of said plenum and connected thereto.

5. The filter unit set forth in claim 1 wherein:

said means for supporting said divider plate means includes opposed end caps for said filter element, said ends caps including, respectively, opposed projection means formed thereon and forming cooperating recess means for retaining said divider plate means on said filter element.

6. The filter unit set forth in claim 1 wherein:

said filter element is mounted above and on said support means in said hopper and said hopper includes access door means above said filter element in a working position of said hopper for gaining access to said filter element.

7. The filter unit set forth in claim 6 including:

a closure plate secured to said filter element and closing one end of said clean air chamber.

8. A porous media barrier type air filter element comprising:

a filter media member configured to form an enclosure defining a clean air chamber;

support means for said media member to form said element generally self supporting;

divider plate means extending across said clean air chamber and dividing said clean air chamber into a plurality of subchambers; and means for supporting said divider plate means in said clean air chamber including at least one end cap for said filter media member comprising a member forming a peripheral inner flange, and opposed projection means on said flange for engagement with said divider plate means in supportive reltionship thereto.

9. The filter element set forth in claim 8 wherein:

said divider plate means comprises a flexible plate member, said plate member being sufficiently rigid to be freestanding in a planar configuration and being resiliently deflectable to permit insertion in and removal from said means for supporting said divider plate means.

10. An air filter unit for apparatus such as a power sweeper, including a debris collection and separation hopper, said filter unit being adapted to be supported in said hopper and including:

an elongated oval porous media barrier type filter element defining part of a clean air chamber;

support means for said filter element, said support means including means forming partitions in said filter element for dividing said filter element into portions and said clean air chamber into separate flow chamber segments;

means forming an opening in said support means through which filtered air flow;

a clean air discharge plenum for conducting clean air from said clean air chamber to an outlet of said plenum, said plenum being configured for redirecting air flow at substantially a right angle relative to air flow exiting said clean air chamber, said plenum including means forming a plurality of separate passages in communication with said clean air chamber and said outlet for conducting filtered air from respective portions of said filter element to said outlet; and reverse jet air discharge means disposed adjacent to the outlet of said plenum for discharging jets of pressure air into each of said passages of said plenum to backflush said portions of said filter element.

* * * * *